United States Patent
Kumar et al.

(10) Patent No.: US 10,694,334 B2
(45) Date of Patent: Jun. 23, 2020

(54) METHOD AND/OR SYSTEM FOR POSITIONING OF A MOBILE DEVICE

(71) Applicant: QUALCOMM Incorporated, San Diego, CA (US)

(72) Inventors: Akash Kumar, Hyderabad (IN); Amit Jain, San Diego, CA (US); Ankita, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 161 days.

(21) Appl. No.: 15/589,860

(22) Filed: May 8, 2017

(65) Prior Publication Data

US 2018/0324552 A1   Nov. 8, 2018

(51) Int. Cl.
| | |
|---|---|
| H04W 24/00 | (2009.01) |
| H04W 4/02 | (2018.01) |
| H04W 24/10 | (2009.01) |
| H04W 4/029 | (2018.01) |
| H04W 4/90 | (2018.01) |
| G01S 5/14 | (2006.01) |

(52) U.S. Cl.
CPC .............. *H04W 4/027* (2013.01); *G01S 5/14* (2013.01); *H04W 4/029* (2018.02); *H04W 4/90* (2018.02); *H04W 24/10* (2013.01)

(58) Field of Classification Search
CPC ......... H04W 4/02; H04W 4/22; H04W 64/00; H04W 76/007; H04W 36/08; H04W 36/12; H04W 36/14; H04W 36/18; H04W 36/30
USPC ............. 455/404.1, 404.2, 456.1, 456.2, 436
See application file for complete search history.

(56) References Cited

U.S. PATENT DOCUMENTS

| | | | |
|---|---|---|---|
| 9,414,350 B1 * | 8/2016 | Martin .................. | H04W 64/00 |
| 9,867,190 B1 * | 1/2018 | Sinnaduray ....... | H04W 72/0453 |
| 2005/0267677 A1 * | 12/2005 | Poykko ................. | G01S 5/0252 |
| | | | 701/408 |
| 2006/0009236 A1 | 1/2006 | Bose et al. | |
| 2010/0323723 A1 * | 12/2010 | Gerstenberger ...... | G01S 5/0226 |
| | | | 455/456.5 |
| 2012/0302254 A1 | 11/2012 | Charbit et al. | |
| 2015/0045061 A1 | 2/2015 | Da | |
| 2015/0119078 A1 * | 4/2015 | Sheynblat ............. | G01S 5/0036 |
| | | | 455/456.1 |
| 2015/0312719 A1 | 10/2015 | Cho et al. | |
| 2017/0164322 A1 * | 6/2017 | Shaw .................. | H04W 64/006 |
| 2017/0223594 A1 * | 8/2017 | Comstock ............. | H04W 16/14 |
| 2017/0273045 A1 * | 9/2017 | Etemad ................. | H04W 76/27 |

FOREIGN PATENT DOCUMENTS

| | | |
|---|---|---|
| WO | 2011021153 A1 | 2/2011 |
| WO | 2017014910 A1 | 1/2017 |

OTHER PUBLICATIONS

International Search Report and Written Opinion—PCT/US2018/030067—ISA/EPO—dated Sep. 10, 2018.

* cited by examiner

*Primary Examiner* — Temica M Beamer
(74) *Attorney, Agent, or Firm* — Hunter Clark PLLC

(57) ABSTRACT

Methods and systems are disclosed for obtaining an estimated location of a mobile device. According to an embodiment, a mobile device may obtain a plurality of timing advance parameters based, at least in part, on signals transmitted from the mobile device to a plurality of base stations on uplink channels to the plurality of base stations. An estimated location of the mobile device may be determined based, at least in part, on timing advance parameters.

30 Claims, 8 Drawing Sheets

METHOD AND/OR SYSTEM FOR POSITIONING OF A MOBILE DEVICE

BACKGROUND

Field

Subject matter disclosed herein relates to estimation of a location of a mobile device.

Information

The location of a mobile device, such as a cellular telephone, may be useful or essential to a number of applications including emergency calls, navigation, direction finding, asset tracking and Internet service. The location of a mobile device may be estimated based on information gathered from various systems. In a cellular network implemented according to 4G (also referred to as Fourth Generation) Long Term Evolution (LTE) radio access, for example, a base station may transmit a positioning reference signal (PRS). A mobile device acquiring PRSs transmitted by different base stations may deliver signal-based measurements to a location server, which may be part of an Evolved Packet Core (EPC), for use in computing a location estimate of the mobile device using observed time difference of arrival (OTDOA) techniques. Other techniques, such as enhanced Cell-ID (E-CID), may provide a position fix faster than OTDOA techniques, but with less accuracy. In one implementation of E-CID, range between a mobile device and base station (e.g., an eNodeB base station) may be estimated based, at least in part, on a timing advance parameter obtained based, at least in part, on signals transmitted from the mobile device to the base station on an uplink channel.

SUMMARY

Briefly, one particular implementation is directed to a method at a computing device comprising: obtaining timing advance parameters based, at least in part, on signals transmitted from a mobile device to three or more concurrently connected base stations on uplink channels to the three or more base stations; and computing a first estimated location of the mobile device based, at least in part, on the timing advance parameters and locations of the three or more base stations.

Another particular implementation is directed to a computing device, comprising: a memory; and one or more processors coupled to the memory and configured to: obtain timing advance parameters based, at least in part, on signals transmitted from a mobile device to three or more concurrently connected base stations on uplink channels to the three or more base stations; and compute a first estimated location of the mobile device based, at least in part, on the timing advance parameters and locations of the three or more base stations.

Another particular implementation is directed to a storage medium comprising computer-readable instructions stored thereon which are executable by a one or more processors of a computing device to: obtain timing advance parameters based, at least in part, on signals transmitted from a mobile device to three or more concurrently connected base stations on uplink channels to the three or more base stations; and compute a first estimated location of the mobile device based, at least in part, on the timing advance parameters and locations of the three or more base stations.

Another particular implementation is directed to a computing device comprising: means for obtaining timing advance parameters based, at least in part, on signals transmitted from a mobile device to three or more base stations on uplink channels to the three or more concurrently connected base stations; and means for computing a first estimated location of the mobile device based, at least in part, on the timing advance parameters and locations of the three or more base stations.

Another particular implementation is directed to a method, at a computing device, comprising: obtaining a first estimated location of a mobile device based, at least in part, on observations of one or more signals received at the mobile device at a instance; and determining an assessment of movement of the mobile device subsequent to the instance based, at least in part, on timing advance parameters obtained at the mobile device based, at least in part, on signals transmitted from the mobile device to three or more concurrently connected base stations on uplink channels to the three or more base stations.

Another particular implementation is directed to a computing device, comprising: a memory; and one or more processors coupled to the memory and configured to: obtain a first estimated location of a mobile device based, at least in part, on observations of one or more signals received at the mobile device at an instance; and determine an assessment of movement of the mobile device subsequent to the instance based, at least in part, on timing advance parameters obtained at the mobile device based, at least in part, on signals transmitted from the mobile device to three or more concurrently connected base stations on uplink channels to the three or more base stations.

Another particular implementation is directed to a storage medium comprising computer-readable instructions stored thereon which are executable by a one or more processors of a computing device to: obtain a first estimated location of the mobile device based, at least in part, on observations of one or more signals received at a mobile device at an instance; and determine an assessment of movement of the mobile device subsequent to the instance based, at least in part, on timing advance parameters obtained at the mobile device based, at least in part, on signals transmitted from the mobile device to three or more concurrently connected base stations on uplink channels to the three or more base stations.

Another particular implementation is directed to a computing device comprising: means for obtaining a first estimated location of a mobile device based, at least in part, on observations of one or more signals received at the mobile device at an instance; and means for determining an assessment of movement of the mobile device subsequent to the instance based, at least in part, on timing advance parameters obtained at the mobile device based, at least in part, on signals transmitted from the mobile device to three or more concurrently connected base stations on uplink channels to the three or more base stations.

It should be understood that the aforementioned implementations are merely example implementations, and that claimed subject matter is not necessarily limited to any particular aspect of these example implementations.

BRIEF DESCRIPTION OF THE FIGURES

Claimed subject matter is particularly pointed out and distinctly claimed in the concluding portion of the specification. However, both as to organization and/or method of operation, together with objects, features, and/or advantages thereof, it may best be understood by reference to the following detailed description if read with the accompanying drawings in which:

Figure 1:
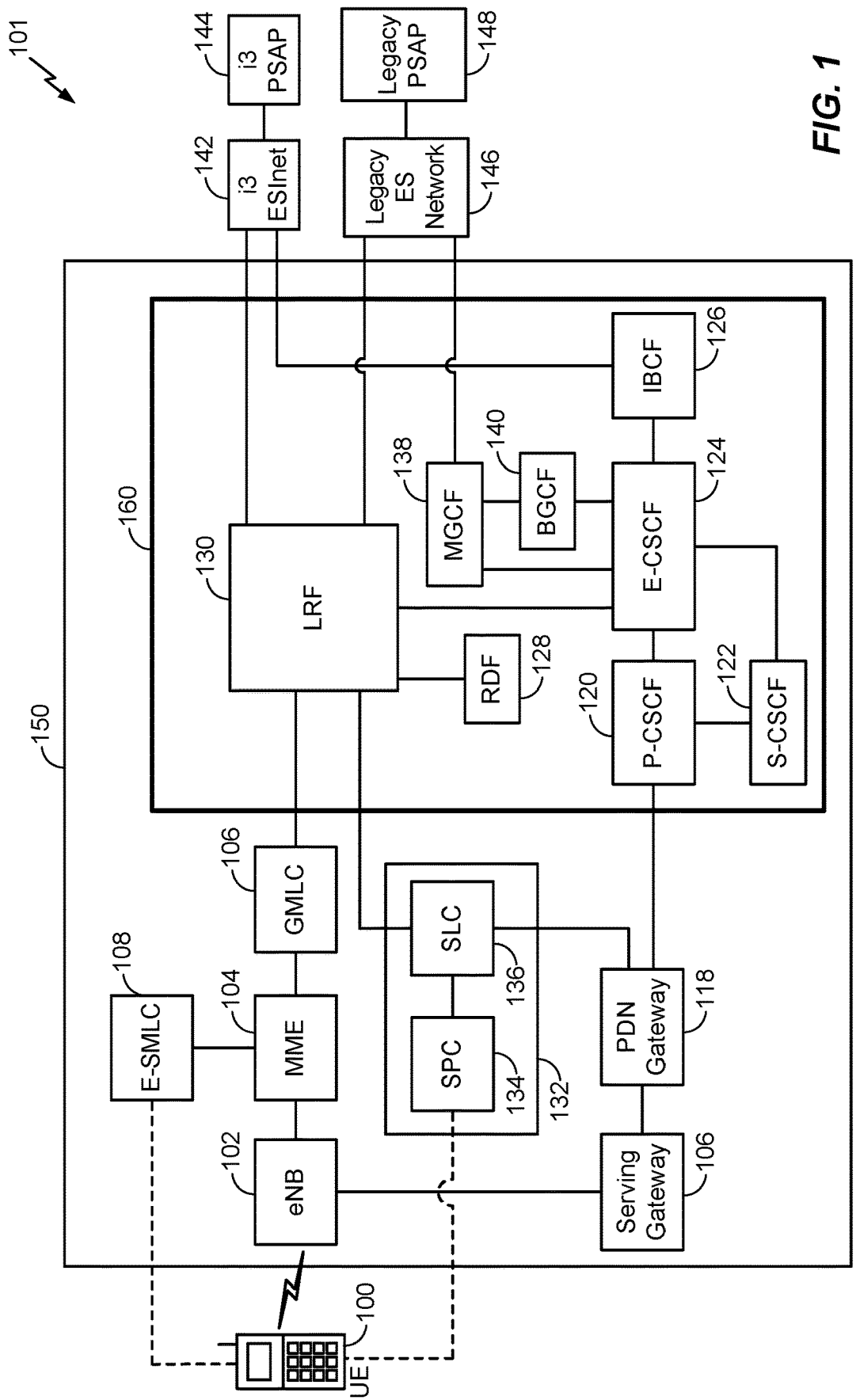
FIG. 1 is an example architecture for terrestrial positioning with 3GPP long term evolution (LTE) access.

Reference is made in the following detailed description to accompanying drawings, which form a part hereof, wherein like numerals may designate like parts throughout that are identical, similar and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

References throughout this specification to one implementation, an implementation, one embodiment, an embodiment, and/or the like mean that a particular feature, structure, characteristic, and/or the like described in relation to a particular implementation and/or embodiment is included in at least one implementation and/or embodiment of claimed subject matter. Thus, appearances of such phrases, for example, in various places throughout this specification are not necessarily intended to refer to the same implementation and/or embodiment or to any one particular implementation and/or embodiment. Furthermore, it is to be understood that particular features, structures, characteristics, and/or the like described are capable of being combined in various ways in one or more implementations and/or embodiments and, therefore, are within intended claim scope. However, these and other issues have a potential to vary in a particular context of usage. In other words, throughout the disclosure, particular context of description and/or usage provides helpful guidance regarding reasonable inferences to be drawn; however, likewise, "in this context" in general without further qualification refers to the context of the present disclosure.

According to an embodiment, an enhanced Cell-ID (E-CID) positioning technique may provide a position fix faster than using observed time difference of arrival (OTDOA) positioning techniques that rely on acquisition of three positioning reference signals (PRSs), but with less accuracy or certainty. In one implementation of E-CID, a range between a mobile device and base station (e.g., an eNodeB base station) may be estimated based, at least in part, on a timing advance parameter obtained based, at least in part, on one or more signals transmitted from the mobile device to the base station on an uplink channel.

Using E-CID positioning, a locus of a location of a mobile device may be determined based, at least part, on a measured distance between the mobile device and a base station and a known location of the base station. For example, such a distance measured between the mobile device and a base station of a primary cell may be determined based, at least in part, on a timing advance parameter based on transmission from the mobile device on an uplink channel to the base station of the primary cell. According to an embodiment, a mobile device may obtain timing advance parameters on three or more uplink channels to three or more different base stations to obtain measurements of ranges to the three of more different base stations. These three or more measurements of ranges to the three of more different base stations may enable trilateration to a unique location estimate.

According to an embodiment, timing advance parameters based on signals transmitted from a mobile device on uplink channels to multiple base stations may be obtained at the mobile device. Determining measurements of range to the base stations based on the timing advance parameters, the mobile device may then compute a unique location estimate using trilateration. Alternatively, the mobile device may forward timing advance measurements to a location server to compute the unique location estimate.

Referring to FIG. 1, an architecture 101 for supporting positioning of a mobile device such as UE 100 with 3GPP Long Term Evolution (LTE) access for a network 150 is shown. The network 150 may comprise an Evolved Packet System (EPS) that supports LTE access (e.g., by UE 100) and possibly other access types such as CDMA2000, Wideband CDMA (WCDMA) and/or WiFi, just to name a few examples. A UE 100 may communicate with a base station such as a serving evolved Node B (eNodeB or eNB) 102 in a radio access network (RAN) to access communication services from the network 150. The RAN may include other network entities not shown in FIG. 1 for simplicity and may also be referred to as an Evolved Universal Terrestrial Radio Access Network (E-UTRAN). The eNB 102 may also be referred to as a Node B, a base station, an access point, etc. The UE 100 may (i) receive signals from eNB 202 and from other base stations (e.g. other eNBs) and access points (APs) in network 150; (ii) obtain the identities of the source eNBs and other base stations or of the source cells from the received signals and/or (iii) obtain measurements of the received signals such as measurements of time of arrival (TOA), RSTD for OTDOA positioning, pilot phase for AFLT positioning, and/or signal strength (e.g. received signal strength indication (RSSI)), signal quality (e.g. signal to noise ratio (S/N)), and/or timing advance parameters for enhanced cell ID (E-CID) positioning. The eNB, base station and/or cell identities and the different signal measurements may be used to derive a location estimate and/or locus of possible locations or estimated locations for UE 100 (e.g., by UE 100 or by a location server such as E-SMLC 108 or SLP 132). While only one eNB 102 is depicted in FIG. 1, the architecture 101 (e.g., network 150) may include multiple eNBs and/or other base stations and/or APs, each with one or more antenna systems such as used with Distributed Antenna Systems (DAS), Remote Radio Heads (RRHs), repeaters and relays.

The eNB 102 may communicate with a serving MME 104 for UE 100, which may perform various control functions such as mobility management, gateway selection, authentication, bearer management, etc. MME 104 may communicate with an Evolved Serving Mobile Location Center (E-SMLC) 108 and a Gateway Mobile Location Center (GMLC) 106. The E-SMLC 108 may support UE-based, UE-assisted, network-based and/or network-assisted positioning methods for UEs including UE 100 and may support one or more MMEs. E-SMLC 108 may support the 3GPP control plane location solution for LTE access as defined in 3GPP technical Specifications (TSs) 23.271 and 36.305. The E-SMLC 108 may also be referred to as a location server (LS), a Stand Alone SMLC (SAS), etc. The GMLC 106 may perform various functions to support location services and provide services such as subscriber privacy, authorization, authentication, billing, etc. A Location Routing Function (LRF) 130 may communicate with GMLC 106 and may route or help route IP-based emergency calls to a Public Safety Answering Points (PSAPs) such as the i3 ESlnet 142 and i3 PSAP 144, and well as legacy systems such as the legacy ES network 146 and the legacy PSAP 148. LRF 230 may also support location requests from PSAPs (e.g., PSAPs 144 and 148) for UEs (e.g., UE 100) that are making emergency calls and may obtain locations for these UEs and return the locations to the requesting PSAPs. In order to support the routing and location functions that LRF 130 performs, LRF 130 may be configured to request the locations of different target UEs (e.g. UE 100) from a GMLC such as GMLC 106. In that case, GMLC 106 may transfer any location request for a target UE (e.g., UE 100) to an MME such as MME 104 which may transfer the request to an E-SMLC such as E-SMLC 108. The E-SMLC (e.g., E-SMLC 108) may then obtain location related measurements for the target UE from the serving eNB for the target UE and/or from the target UE, compute or verify any location estimate for the target UE and return the location estimate via the MME and GMLC (e.g., MME 104 and GMLC 106) to LRF 130. LRF 130 may also or instead be configured to request the locations of different target UEs (e.g., UE 100) from a SUPL Location Platform (SLP) such as SLP 132 described next. SLP 132 may include a SUPL Positioning Center (SPC) 134 and a SUPL Location Center (SLC) 136, and may be configured to communicate location information with the LRF 130 and support the SUPL user plane location solution defined by the Open Mobile Alliance (OMA) in order to obtain the locations of UEs such as UE 100. In order to support positioning of a UE such as UE 100, E-SMLC 108 and SLP 132 may each use the LTE Positioning Protocol (LPP) defined in 3GPP 36.355 and/or the LPP Extensions (LPPe) protocol defined by OMA in which LPP and/or LPPe messages are exchanged between E-SMLC 108 or SLP 132 and the target UE (e.g., UE 100) that is being positioned. In the case of E-SMLC 108, LPP and/or LPPe messages exchanged with a target UE may be transferred as signaling via the serving MME and serving eNB for the target UE (e.g., eNB 102 and MME 104 if the target UE is UE 100). In the case of SLP 132, LPP and/or LPPe messages exchanged with a target UE may be transferred as data using IP transport via a PDN Gateway, Serving Gateway and serving eNB for the target UE (e.g., PDN Gateway 118, Serving Gateway 116 both described next and eNB 102 if the target UE is UE 100).

A Serving Gateway 116 may perform various functions related to IP data transfer for UEs such as data routing and forwarding, mobility anchoring, etc. A Packet Data Network (PDN) Gateway 118 may perform various functions such as maintenance of data connectivity for UEs, IP address allocation, etc. An IP Multimedia Subsystem (IMS) 160 for network 250 may include various network entities to support IMS services such as Voice-over-IP (VoIP) calls and VoIP emergency calls. The IMS 160 may include a Proxy Call Session Control Function (P-CSCF) 120, a Serving Call Session Control Function (S-CSCF) 122, an Emergency Call Session Control Function (E-CSCF) 224, a Breakout Gateway Control Function 140, a Media Gateway Control Function (MGCF) 138, an Interconnection Border Control Function (IBCF) 126, a Routing Determination Function (RDF) 128 and the LRF 130.

In operation, the network 150 may utilize LTE interfaces and protocols for control plane location. The LPP protocol combined with the LPPe protocol may be used over the Uu interface between the UE 100 and the eNB 102 for positioning of the UE 100 by the E-SMLC 108. LPP/LPPe messages may be transferred (as previously described) between the UE 100 and the E-SMLC 108 via the MME 104 and the eNB 102 for the UE 100 as described in 3GPP TSs 23.271 and 36.305. The E-SMLC 108 may be configured to request (e.g., by sending an LPP/LPPe Request Location Information message to UE 100), and the UE 100 may be configured to provide (e.g., by sending an LPP/LPPe Provide Location Information message to E-SMLC 108) the signal measurements (e.g., RSSI, RTT, RSTD measurements), timing advance parameters and identities of visible cells.

In an alternative embodiment, either (i) the LPP protocol alone without LPPe or (ii) the RRC protocol defined in 3GPP 36.331 may be used over the Uu interface between the UE 100 and the serving eNB 102 for positioning of the UE 100 by the E-SMLC 108. In the case of LPP (alternative (i)), LPP messages may be transferred between the UE 100 and the E-SMLC 108 via the MME 104 and the serving eNB 102 for the UE 100 as described in 3GPP TSs 23.271 and 36.305. In the case of RRC (alternative (ii)), RRC messages may be transmitted between UE 100 and serving eNB 102, and LTE Positioning Protocol A (LPPa) messages (defined in 3GPP TS 36.455) may be transferred between eNB 102 and E-SMLC 108 via the MME 104 for the UE 100 as described in 3GPP TSs 23.271 and 36.305. In an example, E-SMLC 108 may be configured to request (e.g., by sending an LPP Request Location Information message to UE 100 or an LPPa request message to eNB 202, which may prompt eNB 202 to send an RRC request message to UE 100), and the UE 100 may be configured to provide (e.g., by sending an LPP Provide Location Information message to E-SMLC 108 or an RRC response to eNB 202 which causes eNB 202 to send an LPPa response to E-SMLC 208) the signal measurements (e.g., RSTD measurements) and identities of visible cells.

A Location Services (LCS) Application Protocol (LCS-AP) defined in 3GPP TS 29.171 may be used over an SLs interface between the MME 104 and the E-SMLC 108 to enable the MME 104 to request location information for the UE 100 from the E-SMLC 108 using the 3GPP control plane solution. An Evolved Packet Core (EPC) LCS Protocol (ELP) defined in 3GPP TS 29.172 may be used over an SLg interface between the MME 104 and the GMLC 106 to enable the GMLC 106 to request and obtain location information for the UE 100 using the 3GPP control plane solution.

The network 150 may also utilize interfaces and protocols for SUPL User Plane Location. A Lup interface as defined in OMA-AD-SUPL-V2_0 may be used between the UE 100 (referred to as a SUPL Enabled Terminal (SET)) and the SLP 132 to support positioning of the UE 100 using the OMA SUPL user plane solution. The Lup interface may enable exchange of User Plane Location Protocol (ULP) messages, defined in OMA-TS-ULP-V2_0_3, between the UE 100 and the SLP 132. SLP 132 may comprise a Home SLP (H-SLP) and reside in a home network of a UE (e.g., applicable to UE 100 if network 150 is the home network for UE 100) or may be a Discovered SLP (D-SLP) or Emergency SLP (E-SLP). A D-SLP may be used to position UE 100 in any network (e.g., applicable if network 150 is not the home network for UE 100) and an E-SLP may be used to position UE 100 if UE 100 is establishing or has established an emergency call (e.g., a VoIP emergency call via IMS 160 to i3 PSAP 144 or legacy PSAP 148). SLP 132 is split into the SLC 136 and the SPC 134 which may be separate logical functions of a single physical SLP 132 or separate physical entities. The SLC 136 is configured to establish and control a SUPL session with the UE 100. The SPC 134 is configured to obtain a location of the UE 100. The endpoint for any ULP message is then either the SLC 136 or the SPC 134 depending on whether the ULP message is used for control and service provision or for positioning. In the case of the UE 100 (e.g., with LTE access), the ULP messages used for positioning typically each encapsulate one or more LPP messages. Each encapsulated LPP message can further encapsulate one LPPe message, thereby enabling exchange of LPP and/or LPP/LPPe positioning protocol messages between UE 100 and SLP 132 as previously described. To support heightened accuracy location, LPP/LPPe may be used to enable the SPC 134 to request, and the UE 100 to return the same information (e.g., cell identities and RSTD measurements) as described for control plane location described above.

According to an embodiment, and as described in greater detail below, a mobile device (e.g., a UE) may receive one or more messages from a server comprising positioning assistance data for a downlink terrestrial positioning method. In addition, positioning assistance data may identify a plurality of cell transceivers and specify additional parameters descriptive of identified cell transceivers, including locations of the identified cell transceivers. The mobile device may then apply a particular processing to receive signals based, at least in part, on the additional parameters descriptive of the identified cell transceivers.

According to an embodiment, a UE may make multiple measurements involving radio sources—e.g. by using the cells associated with the radio sources a reference cell or neighbor cells for OTDOA. A location server can then receive OTDOA measurements from the UE that comprise measurements of reference signal time differences (RSTDs). As defined in 3GPP TS 36.214, an RSTD measurement is a measurement of a difference between the signal (e.g., PRS) time of arrival (TOA) from the reference cell at the UE and the TOA from any neighbor cell at the UE.

Figure 2:
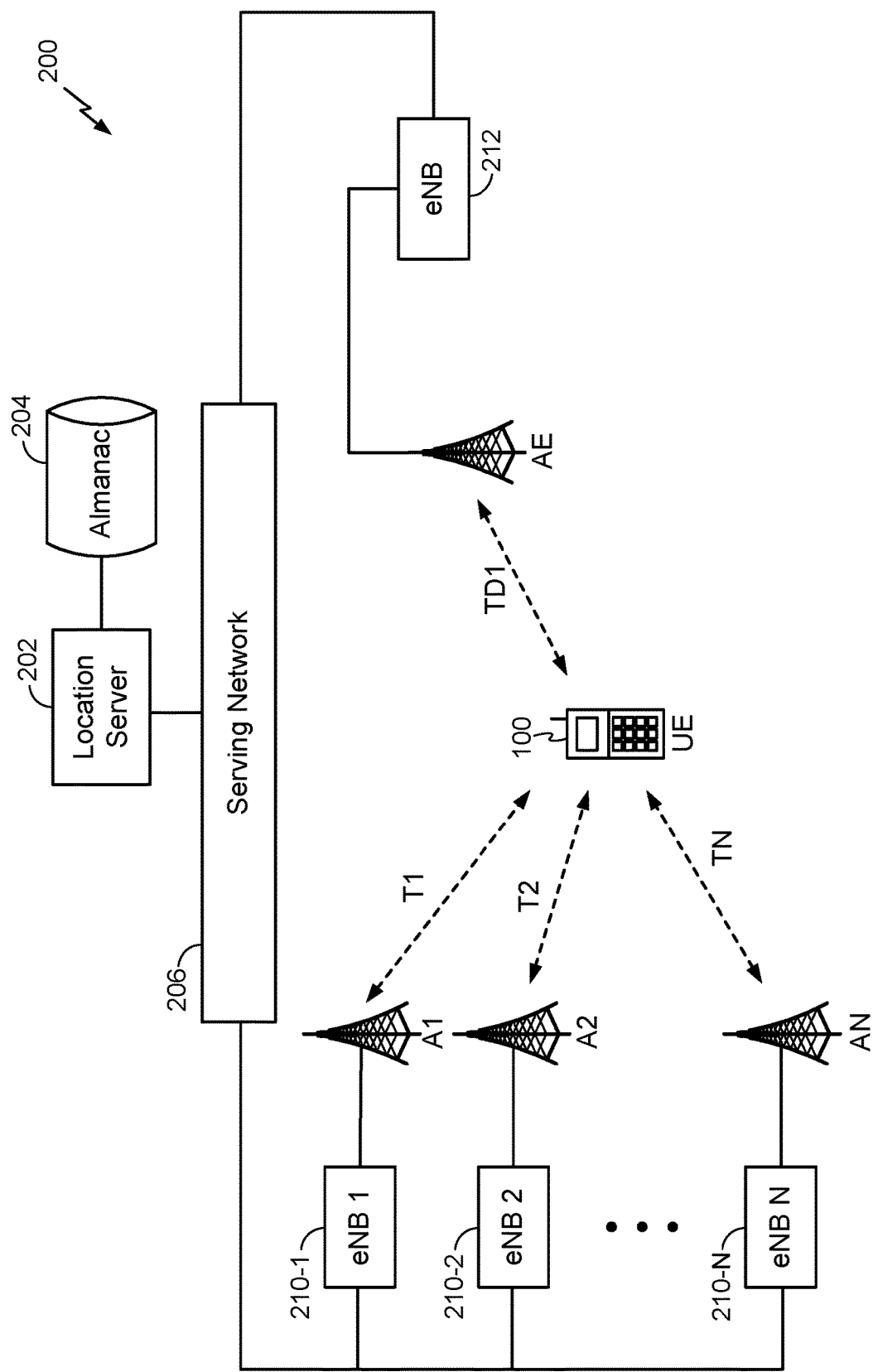
FIG. 2 is a schematic diagram of an architecture of an example wireless communication network for support positioning according to an embodiment.

FIG. 2 shows an example of the system shown in FIG. 1 including a wireless communication system 200 employing LTE access. The wireless communication system 200 includes a location server 202 and an almanac 204. The location server 202 and almanac 204 may be included as part of a serving network 206 or may be attached to or reachable from a serving network 206. For example, the serving network 206 may correspond to network 150 in FIG. 1, and the location server 202 may correspond to E-SMLC 108 or to SLP 132 in network 150 or may be another location server such as a Standalone Serving Mobile Location Center (SAS). The serving network 206 may include one or more access points such as eNB 1 210-1, eNB 2 210-2, eNB N, 210-N, and eNB 212. There may be other eNBs not explicitly shown in FIG. 2 such as eNBs n 210-n with n between 3 and N−1. Any one of the access points (e.g., eNB 212) may correspond to eNB 102 in FIG. 1. Each of the access points may be operably connected to one or more antennas. The antennas comprise A1, A2, AN in the case of eNBs 210-1, 210-2 . . . 210-N, respectively, and AE in the case of eNB 212. An almanac 204 represents a database structure which may belong to serving network 206 and/or to location server 202 and may, in some embodiments, be part of location server 202 (e.g., contained in a storage medium in location server 202). Almanac 204 is configured to store identification and location parameters for the access points and base stations (e.g., eNBs) and antennas within the serving network 206 and may comprise a BSA of the type previously described here.

FIG. 2 shows N eNBs 210-1, 210-2, . . . , 210-N and 212 that each support a single cell using a single antenna labelled A1, A2 to AN, and AE. It should be understood that in other implementations, a base station may employ multiple antennas. Antennas A1, A2 to AN, and AE may support transmission of signals between UE 100 and eNBs 210-1, 210-2, . . . , 210-N and 212 through wireless links T1, T2, . . . , TN and TD1, which may support uplink and downlink channels. As described below, UE 100 may determine one or more timing advance parameters based, at least in part, on signals transmitted on signals transmitted by UE 100 on uplink channels and processing frames received on downlink channels that are transmitted by eNBs in response to the signals transmitted in the uplink channels. Based, at least in part, on timing advance parameters determined at UE 100, a unique estimated location UE 100 may be determined. In one implementation, such an estimated location may be determined at UE 100. In an alternative implementation, UE 100 may transmit determined timing advance parameters in one or more messages to location server 202 to enable location server 202 to determine such an estimated location.

Figure 3:
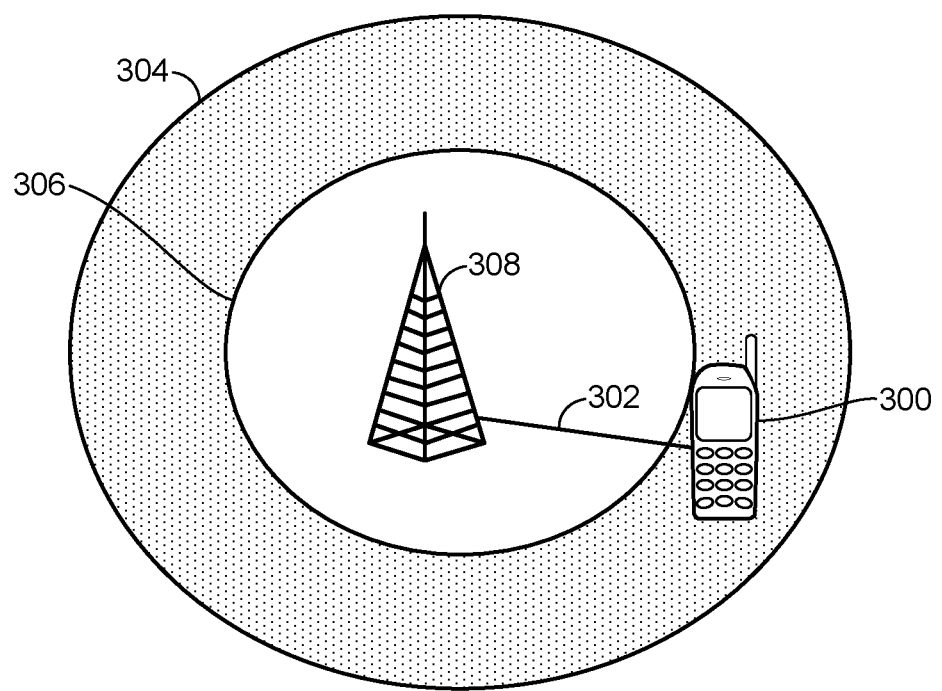
FIG. 3 is a schematic diagram illustrating determination of a locus of a location of a mobile device according to an embodiment.

FIG. 3 is a schematic diagram illustrating a coverage area 304 of a cell in a wireless cellular network served by a base station 308 according to an embodiment. In an implementation of E-CID, a distance 302 between a mobile device 300 and base station 308 in combination with a location of base station 308 may be used to define a locus 306 of possible locations (or estimated locations) of mobile device 300. For example, locus 306 may be determined as a circle centered at a known location of base station 308 and having a radius of distance 302.

In one embodiment, mobile device 300 may determine an estimated or measured range to base station 308 based, at least in part, on a known transmission power of a downlink signal and a received transmission power of the downlink signal using a path loss computation, for example. Mobile device 300 may refine or adjust such an estimated or measured range to base station 308 based, at least in part, on timing advanced parameters received in timing advance commands. In one embodiment, mobile device 300 may determine an estimated or measured range to base station 308 based, at least in part, on a known transmission power of a downlink signal and a received transmission power of the downlink signal using a path loss computation, for example. Mobile device 300 may refine or adjust such an estimated or measured range to base station 308 based, at least in part, on timing advanced parameters received in timing advance commands. For example, a timing advance command may comprise a field expressing a timing advance index value $T_A$ of 0 to 1282 for specifying a size of an adjustment to be made in the timing of messages in an uplink channel (e.g., in increments of 16.0 ρsec). The size of adjustment to be made to timing of messages in the uplink channel may then be used to compute an adjustment to a current estimate or measurement of range to base station 308.

A recent release of 3GPP standard specifies an uplink carrier aggregation (ULCA) mode that enables a mobile device to transmit multiple uplink signals to multiple different neighboring base stations. (See, e.g., 3GPP ref. 36.860 for "LTE-Advanced dual uplink inter-band Carrier Aggregation (CA)") Furthermore, multiple timing advance parameters may be obtained by transmission by a mobile device of signals to multiple different base stations on the multiple different uplink channels (e.g., in an LTE Random Access Procedure (RACH)). Ranges between the mobile device and the different base stations may be measured or estimated based, at least in part, on the obtained timing advance parameters.

In one technique for E-CID positioning, a range to a base station may be determined to be a range based on a timing advance parameter determined from transmission of a signal on an uplink channel to a base station of a primary cell (e.g., serving cell). In the particular example of FIG. 3, base station 308 may comprise a base station of a primary cell and locus 306 may be centered about the center of the primary cell (e.g., centered about a known location of base station 308).

Figure 4:
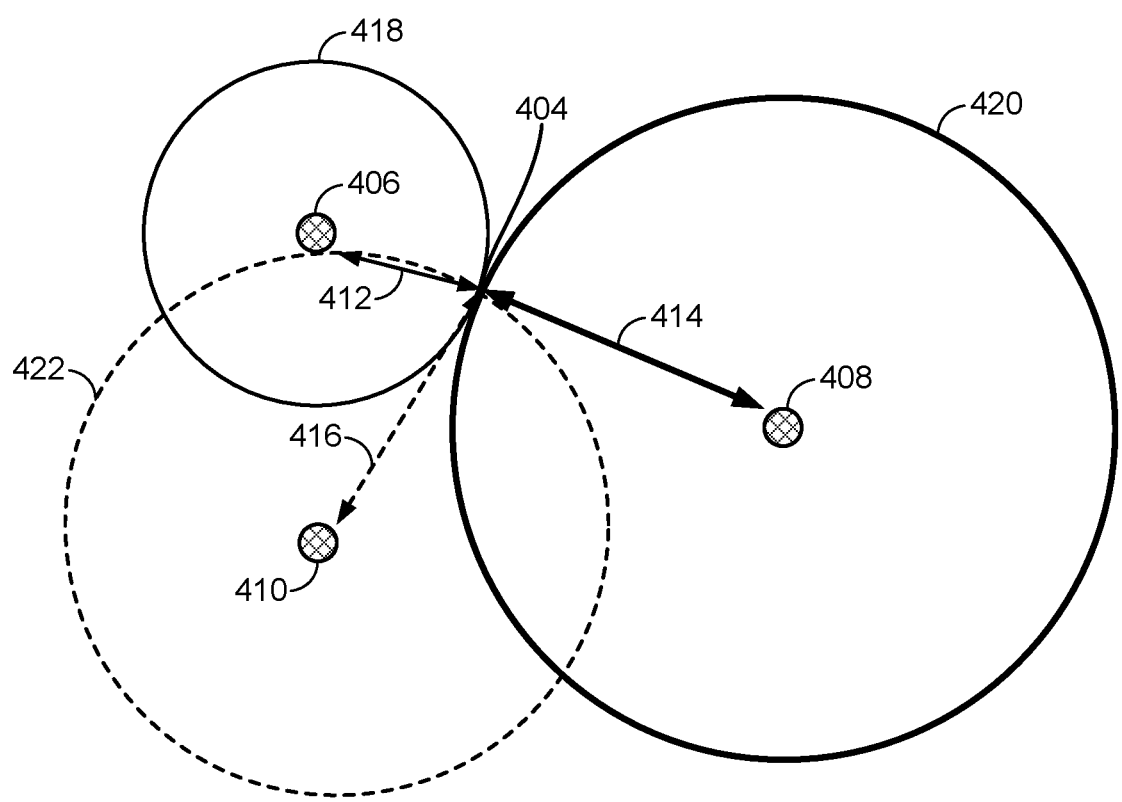
FIG. 4 is a schematic diagram illustrating determinations of a an estimated location of a mobile device according to an embodiment.

However, merely a locus of locations based on a timing advance parameter obtained from transmission of a signal on an uplink channel to a base station of a primary cell may not provide sufficient accuracy or certainty for some applications. Using available timing advance parameters obtained from transmission of signals on uplink channels to three or more base stations, however, may enable determination of a unique location estimate. For example, as illustrated in FIG. 4, a mobile device 404 may obtain timing advance parameters from signals transmitted in a first uplink channel to a base station 406, signals transmitted in a second uplink channel to a base station 408 and signals transmitted in a third base station 410. Here, a measured range 412 between mobile device 404 and base station 406 based on a first timing advance parameter, in combination with a location of base station 406, may define a first locus 418 of possible locations of mobile device 404. Similarly, a measured range 414 between mobile device 404 and base station 408 based on a second timing advance parameter, in combination with a location of base station 408, may define a second locus 420 of possible locations of mobile device 404. Likewise, a measured range 416 between mobile device 404 and base station 410 based on a third timing advance parameter, in combination with a location of base station 410, may define a third locus 422 of possible locations of mobile device 404. According to an embodiment, an estimated location of mobile device 404 may be determined based, at least in part, on first, second and third loci 418, 420 and 422 using trilateration.

Figure 5A:
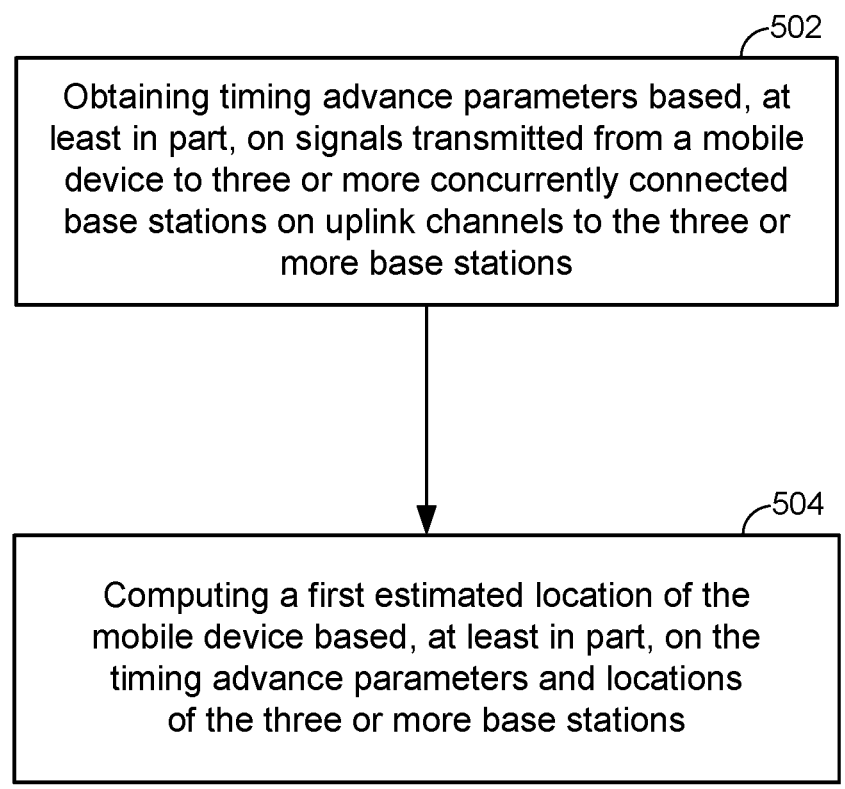
FIG. 5A is a flow diagram of a process to determine an estimated location of a mobile device according to an embodiment.

FIG. 5A is a flow diagram of a process for determining an estimated location of a mobile device according to an embodiment. According to an embodiment, the actions shown in FIG. 5A may be performed by a computing device such as a computing device at a mobile device (e.g., UE 100) or server (e.g., location server 202).

At block 502 three or more timing advance parameters may be obtained based, at least in part, on signals transmitted from a mobile device to three or more base stations on uplink channels. In this context, a "timing advance parameter" as referred to herein means a parameter that may be applied by a mobile device to affect the timing of transmitting frames in an uplink channel to a base station that is based, at least in part, on a measured signal propagation delay. In one non-limiting example, a timing advance parameter may comprise a timing offset relative to a reference time. In one example implementation, a timing advance parameter may be determined or updated at a mobile device based on a timing advance command received from the base station in a downlink frame. Such a timing advance command may specify, for example, an adjustment to be applied to subsequent frames to be transmitted in an uplink channel. It should be understood, however, that these are merely examples implementations of a timing advance parameter, and that claimed subject matter is not limited in this respect.

In a particular implementation, a mobile device may operate in an LTE carrier network that has implemented uplink carrier aggregation (ULCA) employ the mobile device to receive downlink messages from multiple different base stations contemporaneously. From time to time a mobile device operating in an implementation of ULCA may transmit messages on any one of multiple different uplink channels to different base stations. To facilitate the timing and synchronization of such messages on different uplink channels, the mobile device may obtain timing advance parameters based, at least in part, on signals transmitted on the different uplink channels. In one implementation, a mobile device operating in an implementation of ULCA may transmit a Random Access Preamble in an LTE Random Access Procedure (RACH) on uplink channels to three or more different base stations. In response to transmission of a Random Access Preamble from a mobile device, a base station may transmit a Random Access Response message. The mobile device may receive Timing Advance Commands in Random Access Response frames in downlink channels from the three or more different base stations. Based, at least in part, on the received Timing Advance Commands, the mobile device may determine corresponding timing advance parameters (e.g., that may be used to synchronize transmission of subsequent uplink frames).

According to an embodiment, multiple timing advance measurements to multiple different base stations may be obtained at block 502 from frequent handover events in an environment of dense femto and pico cell deployments. Here, a mobile device may report a timing advance parameter based on signals transmitted on an uplink to a base station of a current serving cell and other neighboring cell the mobile device is communicating with during a soft handover scenario. The mobile device may store or report timing advance parameters for a few past cells from which the mobile device has been handed over.

According to an embodiment, particular versions of an LTE network (e.g., version Rel 12/13) may include a two-bit TAG ID field in a Timing Advance Command MAC Control Element indicating a Timing Advance Group Identity of an addressed Timing Advance Group. Such a TAG ID field may enable a mobile device to uniquely associate timing advance commands (e.g., received in Timing Advance Command MAC Control Elements) with particular uplink channels. In a particular implementation, a mobile device may determine whether a current serving network implements the two-bit TAG ID field. In a particular implementation, a mobile device may determine whether a carrier is implementing Re112 or higher based, at least in part, on contents of an Over the Air (OTA) signaling message. The mobile device may then decode the first two bits of a timing advance MAC control element to determine timing advance parameters of each uplink channel. Once a mobile device decodes timing advance parameters for multiple different uplink channels, the mobile device may transmit messages to a location server containing obtained timing advance parameters in combination with identifiers associated with the different uplink channels. Referring to the particular example of FIG. 4, mobile device 404 may decode TAG ID fields of Timing Advance Command MAC Control Elements received from base stations 406, 408 and 410. Mobile device 404 may then report timing advance parameters in received in Timing Advance Command MAC Control elements along with decoded TAG ID fields in messages to a location server. The location server may then computing an estimated location of mobile device 404 as discussed above.

Particular implementations of block 502 may be applied to ULCA implemented in an LTE network. In another implementation, a mobile device may obtain timing advanced parameters from signals transmitted on multiple different uplink channels in an environment of dense femto and pico cell deployment where frequent cell handover events occur. Here, a mobile device may obtain and report a timing advance parameters of a current serving cell and other neighboring cells the mobile device communicates with during a soft handover scenario. In one implementation, a mobile device may report a history of timing advance values obtained from recent handover events. This may enhance timing advance based positioning since in such small cell scenarios, handovers may occur frequently. In one embodiment, block 502 may evaluate a density of femto cell and/or pico cell deployment in a vicinity of a mobile to determine whether timing advance parameters are sufficiently reliable/accurate for computing an estimated location (e.g., at block 504).

Block 504 may comprise computing a first estimated location of a mobile device based, at least in part, on the three or more timing advance parameters determined at block 502. As illustrated in FIG. 4, for example, block 504 may comprise computing an estimated location of the mobile device based, at least in part, on locations of the three or more base stations and measured ranges to the three or more base stations (based on the obtained three or more timing advance parameters) using trilateration.

According to an embodiment, actions performed at blocks 502 and 504 may be performed at a mobile device such as UE 100 or mobile device 404. For example, a mobile device may obtain timing advance parameters at block 502 based, at least in part, on signals transmitted by the mobile device to through uplink channels to the three or more base stations. At block 504, the mobile device may then compute an estimated location of the mobile device using trilateration based, at least in part, on measured ranges to the three or more base stations (based on the obtained timing advance parameters) and locations of the three or more base stations. The mobile device may obtain the locations of the three or more base stations from positioning assistance data (e.g., received in a message from location server 202).

In an alternative embodiment, actions performed at blocks 502 and 504 may be performed at a location server such as location server 202. At block 502, a location server may receive a message from a mobile receive comprising three or more timing advance parameters determined based, at least in part, on signals transmitted by the mobile device in uplink channels to three or more base stations. At block 504, the location server may then compute an estimated location of the mobile device using trilateration based, at least in part, on measured ranges to the three or more base stations (based on the obtained timing advance parameters) and locations of the three or more base stations. The location server may obtain the locations of the three or more base stations from a database (e.g., a database maintained at almanac 204).

In some applications, a previous estimated location of a mobile device (e.g., determined using OTDOA, processing of GNSS signals, or other techniques identified above) may be sufficiently reliable or accurate to satisfy a request for a current estimated location of the mobile device. In one particular application, in response to an emergency event, i3 PSAP 144 or legacy PSAP 148 may initiate an E911 request to UE 100 to provide an early position fix to be followed by a more robust final position fix. According to an embodiment, in lieu of computing an estimated location of at block 504, a computing device may determine whether a previous position fix is sufficiently reliable or accurate based, at least in part, on timing advance parameters obtained at block 502. For example, in response to an E911 request to provide an early position fix, UE 100 may analyze timing advance parameters obtained since a most recent position fix (stored in memory) to detect whether there has been significant motion of UE 100 since the most recent position fix. This may be determined based, at least in part, on a comparison of past timing advance parameters with current timing advance parameters (e.g., determine whether a difference between past timing advance parameters and current timing advance parameters exceeds a threshold). In response to a determination that there has not been significant motion of UE 100 since the most recent position fix, UE 100 may furnish the stored most recent position fix to satisfy the request for an early position fix.

In another embodiment, blocks 502 and 504 may be directed to obtaining an initial or first estimated location for an early position fix in response to an E911 request to be followed by a more accurate subsequent final position fix. Here, a history of timing advance parameters may be stored and then retrieved at block 502 in response to an E911 request, followed by computation of a first estimated location at block 504. Subsequently, a second estimated location may be obtained using any one of several techniques discussed above. For example, the second estimated location may be obtained using OTDOA by obtaining one or more RSTD measurements.

In other implementations, motion of a mobile device may be detected based on a set of timing advance parameters {T1, T2 ... Tn} for uplink channels 1 through n. As pointed out above, a base station may continuously measure timing of uplink signals from mobile devices and adjust uplink transmission timing by sending values for adjustment of timing of uplink messages to respective UEs through Timing Advance commands. Having precision timing advance parameters for multiple different cells at a mobile device, mobility of the mobile device may be estimated with a fairly high accuracy. In one implementation, a timing advance parameter may be used in conjunction with any one of several different position estimation techniques discussed above to detect whether a position of a mobile device has significantly changed (e.g., to determine whether to re-execute a positioning process or just return a most recent position fix).

Figure 5B:
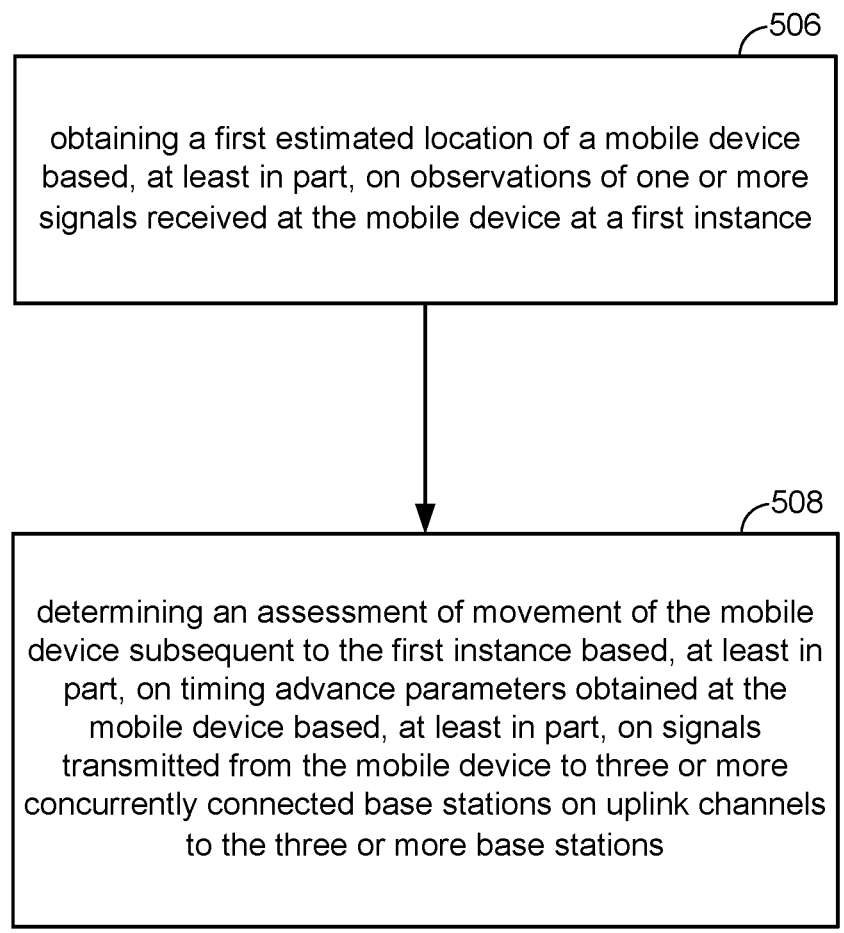
FIG. 5B is a flow diagram of a process to assess motion of a mobile device according to an embodiment.

FIG. 5B is a flow diagram of a process for determining an assessment of movement of a mobile device. According to an embodiment, the actions shown in FIG. 5B may be performed by a computing device such as a computing device at a mobile device (e.g., UE 100) or server (e.g., location server 202).

Block 506 may comprise obtaining a first estimated location of a mobile device based, at least in part, on observations of one or more signals received at a mobile device at an instance. In this context, "observations of one or more signals" means of any signal observable at the mobile device such as, for example, GNSS signals or terrestrial positioning signals. Block 508 comprises determining an assessment of movement of a mobile device subsequent to the instance based, at least in part, on timing advance parameters obtained at the mobile device. Here, a first estimated location of In a particular example, a positioning process may obtain a first position fix (e.g., based on OTDOA measurements, observations of GNSS signals or other positioning techniques) to estimate a location of a mobile device responsive to a first location request. A set of timing advance parameters {T1, T2 ... Tn} obtained at the mobile device at a time of a second location request may indicate that the location of the mobile device has not changed significantly since the first position fix. In this case, the positioning process may return the first position fix (e.g., to a location server) responsive to the second location request without obtaining additional measurements or observations (e.g., RSTD measurements or observations of GNSS signals).

In one implementation, a history of recent position fixes (e.g., using OTDOA, GNSS or other methods) may be tagged with sets of contemporaneous timing advance parameters {T1, T2 ... Tn}. For example, the last few location determination or positioning sessions may be tagged with sets of timing advance parameters obtained contemporaneously with the positioning sessions. For example, a position fix P1 may be tagged with a set of timing advance parameters TA1 obtained contemporaneously with position fix P1, a position fix P2 may be tagged with a set of timing advance parameters TA2 obtained contemporaneously with position fix P2, and so on. In an alternative implementation, a set of measurements or observations (e.g., RSTD measurements or GNSS observations) used for position fix P1 or P2 may be tagged with a set of contemporaneous timing advance parameters TA1 or TA2. In response to an E911 location request, for example, a current set of timing advance parameters may be compared with a previous set of timing advance parameters (e.g., TA1 or TA2) to determine whether a position fix tagged with the previous set of timing advance parameters. For example, if a difference between a current set of timing advance parameters and the previous set of timing advance parameters is small, the position fix tagged with the previous set of timing advance parameters may be used to satisfy the E911 location request by, for example, responding immediately with a message to a location server or base station with the position fix tagged with the previous set of timing advance parameters. Here, this previous position fix may be stored in a memory (e.g., in a cache) in association with the previous set of timing advance parameters tagged with the position fix. This may enable providing a very low time-to-fix in responding to a location request initiated by an E-911 call with an acceptable level of accuracy. This may provide improved performance over just returning the last cached report/location.

Figure 6:
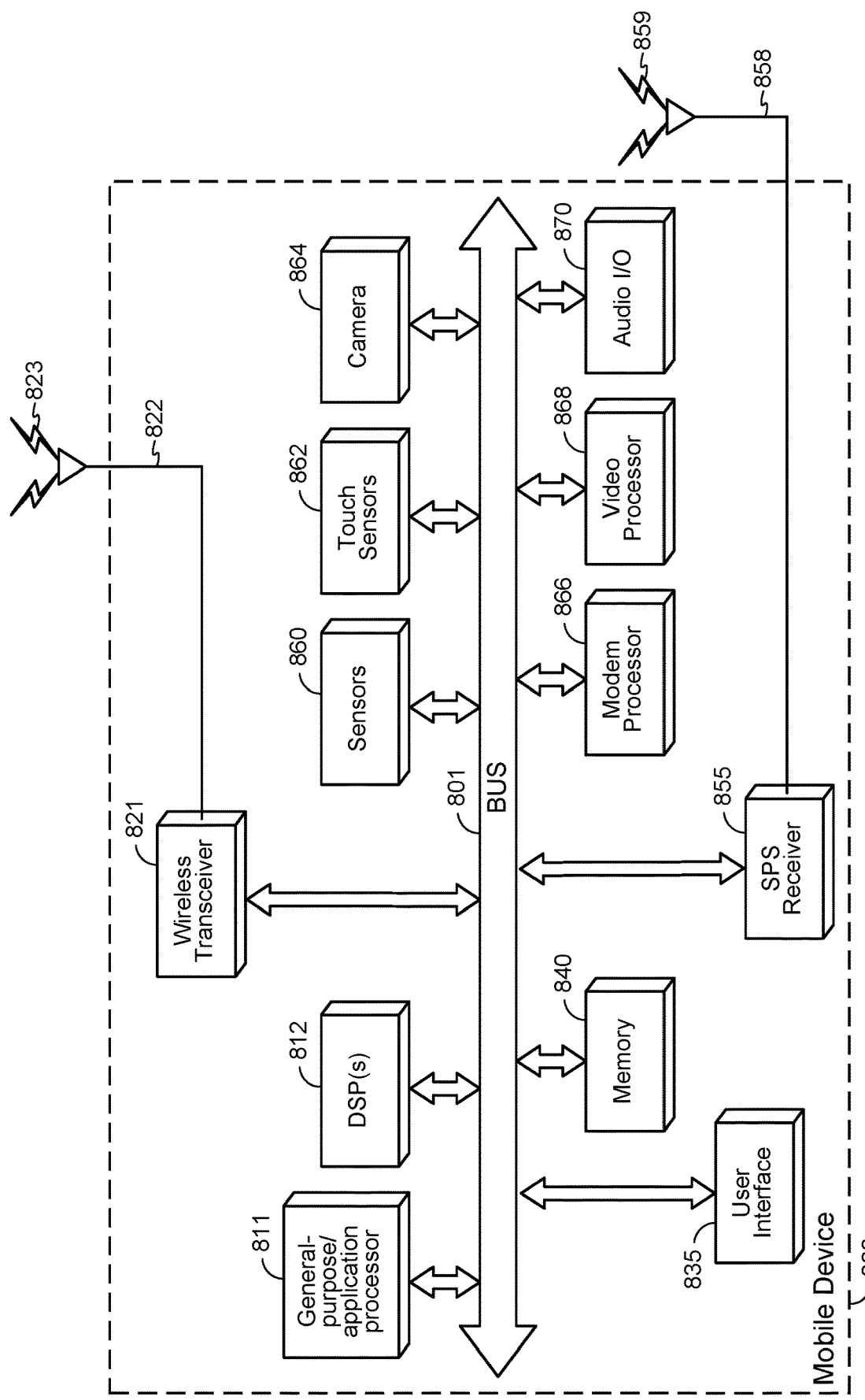
FIG. 6 is a schematic block diagram of a mobile device, in accordance with an example implementation.
Figure 7:
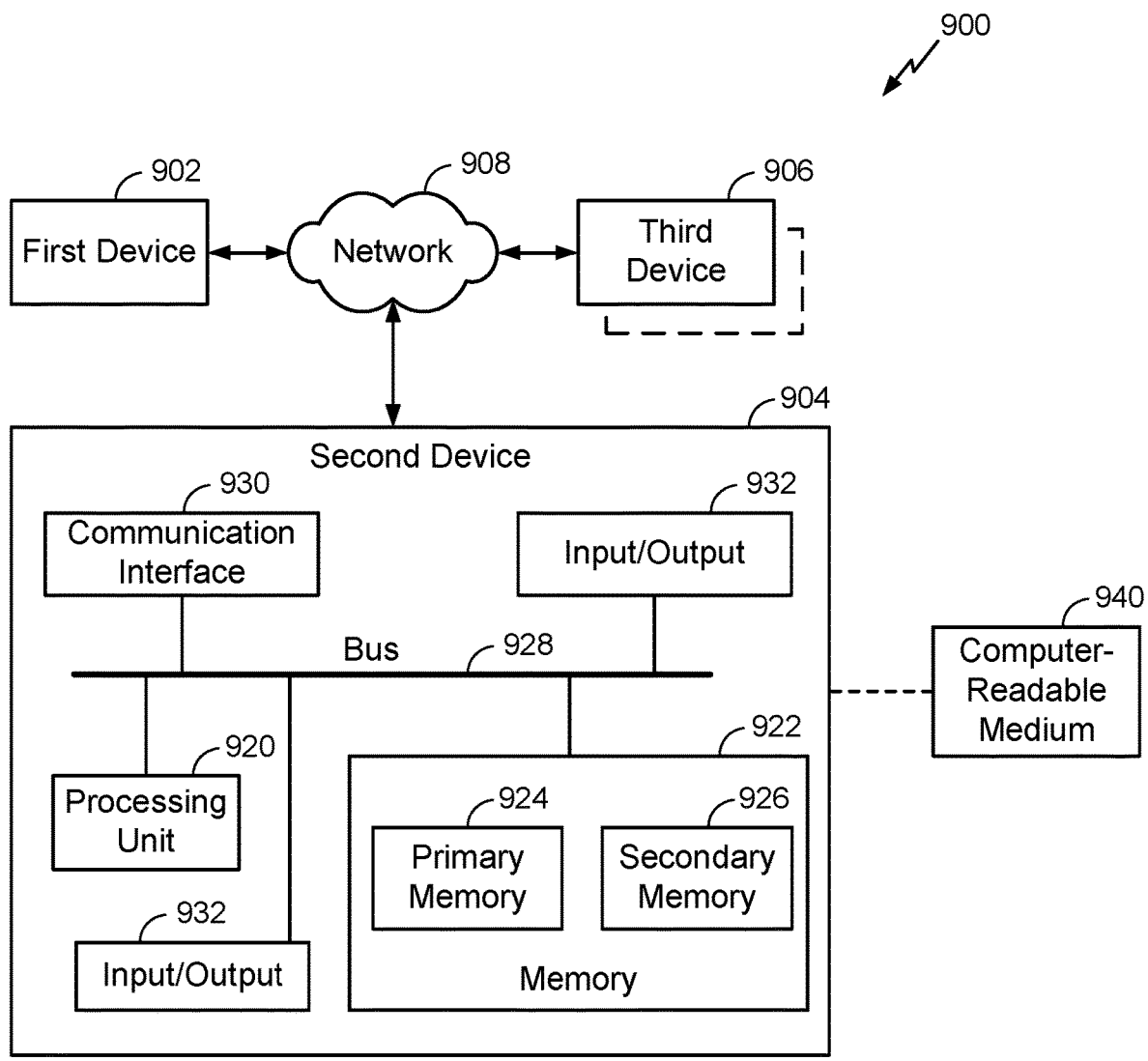
FIG. 7 is a schematic block diagram of an example computing platform in accordance with an implementation.

Subject matter shown in FIGS. 6 and 7 may comprise features, for example, of a computing device, in an embodiment. It is further noted that the term computing device, in general, refers at least to one or more processors and a memory connected by a communication bus. Likewise, in the context of the present disclosure at least, this is understood to refer to sufficient structure within the meaning of 35 USC § 112(f) so that it is specifically intended that 35 USC § 112(f) not be implicated by use of the term "computing device," "wireless station," "wireless transceiver device" and/or similar terms; however, if it is determined, for some reason not immediately apparent, that the foregoing understanding cannot stand and that 35 USC § 112(f) therefore, necessarily is implicated by the use of the term "computing device," "wireless station," "wireless transceiver device" and/or similar terms, then, it is intended, pursuant to that statutory section, that corresponding structure, material and/or acts for performing one or more functions be understood and be interpreted to be described at least in FIGS. 5A and 5B, and corresponding text of the present disclosure.

FIG. 6 is a schematic diagram of a mobile device 800 according to an embodiment. UE 100, mobile device 300 and/or mobile device 404 as shown in FIGS. 1, 2, and 4 may comprise one or more features of mobile device 800 shown in FIG. 6. In certain embodiments, mobile device 800 may comprise a wireless transceiver 821 which is capable of transmitting and receiving wireless signals 823 via wireless antenna 822 over a wireless communication network. Wireless transceiver 821 may be connected to bus 801. Some embodiments may include multiple wireless transceivers 821 and wireless antennas 822 to enable transmitting and/or receiving signals according to corresponding multiple wireless communication standards such as, for example, versions of IEEE Standard 802.11, CDMA, WCDMA, LTE, UMTS, GSM, AMPS, Zigbee, Bluetooth and a 5G or NR radio interface defined by 3GPP, just to name a few examples. In a particular implementation, wireless transceiver 821 may transmit signals on an uplink channel and receive signals on a downlink channel as part of a RACH procedure as discussed above.

Mobile device 800 may also comprise SPS receiver 855 capable of receiving and acquiring SPS signals 859 via SPS antenna 858 (which may be the same as antenna 822 in some embodiments). SPS receiver 855 may also process, in whole or in part, acquired SPS signals 859 for estimating a location of mobile device 800. In some embodiments, general-purpose processor(s) 811, memory 840, digital signal processor(s) (DSP(s)) 812 and/or specialized processors (not shown) may also be utilized to process acquired SPS signals, in whole or in part, and/or calculate an estimated location of mobile device 800, in conjunction with SPS receiver 855. Storage of SPS, TPS or other signals (e.g., signals acquired from wireless transceiver 821) or storage of measurements of these signals for use in performing positioning operations may be performed in memory 840 or registers (not shown). General-purpose processor(s) 811, memory 840, DSP(s) 812 and/or specialized processors may provide or support a location engine for use in processing measurements to estimate a location of mobile device 800. In a particular implementation, all or portions of actions or operations set forth for process 500 may be executed by general-purpose processor(s) 811 or DSP(s) 812 based on machine-readable instructions stored in memory 840. For example general-purpose processor(s) 811 or DSP(s) 812 may process a downlink signal acquired by wireless transceiver 821 to, for example, determine timing advance parameters and an estimated location as described above.

Also shown in FIG. 6, digital signal processor(s) (DSP(s)) 812 and general-purpose processor(s) 811 may be connected to memory 840 through bus 801. A particular bus interface (not shown) may be integrated with the DSP(s) 812, general-purpose processor(s) 811 and memory 840. In various embodiments, functions may be performed in response to execution of one or more machine-readable instructions stored in memory 840 such as on a computer-readable storage medium, such as RAM, ROM, FLASH, or disc drive, just to name a few example. The one or more instructions may be executable by general-purpose processor(s) 811, specialized processors, or DSP(s) 812. Memory 840 may comprise a non-transitory processor-readable memory and/or a computer-readable memory that stores software code (programming code, instructions, etc.) that are executable by processor(s) 811 and/or DSP(s) 812 to perform functions or actions described above in connection with FIGS. 5A and 5B.

Also shown in FIG. 6, a user interface 835 may comprise any one of several devices such as, for example, a speaker, microphone, display device, vibration device, keyboard, touch screen, just to name a few examples. In a particular implementation, user interface 835 may enable a user to interact with one or more applications hosted on mobile device 800. For example, devices of user interface 835 may store analog or digital signals on memory 840 to be further processed by DSP(s) 812 or general purpose processor 811 in response to action from a user. Similarly, applications hosted on mobile device 800 may store analog or digital signals on memory 840 to present an output signal to a user. In another implementation, mobile device 800 may optionally include a dedicated audio input/output (I/O) device 870 comprising, for example, a dedicated speaker, microphone, digital to analog circuitry, analog to digital circuitry, amplifiers and/or gain control. It should be understood, however, that this is merely an example of how an audio I/O may be implemented in a mobile device, and that claimed subject matter is not limited in this respect. In another implementation, mobile device 800 may comprise touch sensors 862 responsive to touching or pressure on a keyboard or touch screen device.

Mobile device 800 may also comprise a dedicated camera device 864 for capturing still or moving imagery. Camera device 864 may comprise, for example an imaging sensor (e.g., charge coupled device or CMOS imager), lens, analog to digital circuitry, frame buffers, just to name a few examples. In one implementation, additional processing, conditioning, encoding or compression of signals representing captured images may be performed at general purpose/application processor 811 or DSP(s) 812. Alternatively, a dedicated video processor 868 may perform conditioning, encoding, compression or manipulation of signals representing captured images. Additionally, video processor 868 may decode/decompress stored image data for presentation on a display device (not shown) on mobile device 800.

Mobile device 800 may also comprise sensors 860 coupled to bus 801 which may include, for example, inertial sensors and environment sensors. Inertial sensors of sensors 860 may comprise, for example accelerometers (e.g., collectively responding to acceleration of mobile device 800 in three dimensions), one or more gyroscopes or one or more magnetometers (e.g., to support one or more compass applications). Environment sensors of mobile device 800 may comprise, for example, temperature sensors, barometric pressure sensors, ambient light sensors, camera imagers, microphones, just to name few examples. Sensors 860 may generate analog or digital signals that may be stored in memory 840 and processed by DPS(s) 812 or general purpose application processor 811 in support of one or more applications such as, for example, applications directed to positioning or navigation operations.

In a particular implementation, mobile device 800 may comprise a dedicated modem processor 866 capable of performing baseband processing of signals received and downconverted at wireless transceiver 821 or SPS receiver 855. Similarly, modem processor 866 may perform baseband processing of signals to be upconverted for transmission by wireless transceiver 821. In alternative implementations, instead of having a dedicated modem processor, baseband processing may be performed by a general purpose processor or DSP (e.g., general purpose/application processor 811 or DSP(s) 812). It should be understood, however, that these are merely examples of structures that may perform baseband processing, and that claimed subject matter is not limited in this respect.

FIG. 7 is a schematic diagram illustrating an example system 900 that may include one or more devices configurable to implement techniques or processes described above. System 900 may include, for example, a first device 902, a second device 904, and a third device 906, which may be operatively coupled together through a wireless communications network 908. In an aspect, second device 904 may comprise a server or location server, such as LS 126 or standalone LSF 132 in system 101, or location server 202. Also, in an aspect, wireless communications network 908 may comprise one or more wireless access points, for example. However, claimed subject matter is not limited in scope in these respects.

First device 902, second device 904 and third device 906 may be representative of any device, appliance or machine. By way of example but not limitation, any of first device 902, second device 904, or third device 906 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 902, 904, and 906, respectively, may comprise one or more of a location server, a base station almanac server, a location server function, a base station, or a mobile device in accordance with the examples described herein.

Similarly, wireless communications network 908, may be representative of one or more communication links, processes, or resources configurable to support the exchange of data between at least two of first device 902, second device 904, and third device 906. By way of example but not limitation, wireless communications network 908 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured by third device 906, there may be additional like devices operatively coupled to wireless communications network 908.

It is recognized that all or part of the various devices and networks shown in system 900, and the processes and methods as further described herein, may be implemented using or otherwise including hardware, firmware, software, or any combination thereof.

Thus, by way of example but not limitation, second device 904 may include at least one processing unit 920 that is operatively coupled to a memory 922 through a bus 928.

Processing unit 920 is representative of one or more circuits configurable to perform at least a portion of a data computing procedure or process. By way of example but not limitation, processing unit 920 may include one or more processors, controllers, microprocessors, microcontrollers, application specific integrated circuits, digital signal processors, programmable logic devices, field programmable gate arrays, and the like, or any combination thereof.

Memory 922 is representative of any data storage mechanism. Memory 922 may include, for example, a primary memory 924 or a secondary memory 926. Primary memory 924 may include, for example, a random access memory, read only memory, etc. While illustrated in this example as being separate from processing unit 920, it should be understood that all or part of primary memory 924 may be provided within or otherwise co-located/coupled with processing unit 920.

Secondary memory 926 may include, for example, the same or similar type of memory as primary memory or one or more data storage devices or systems, such as, for example, a disk drive, an optical disc drive, a tape drive, a solid state memory drive, etc. In certain implementations, secondary memory 926 may be operatively receptive of, or otherwise configurable to couple to, a computer-readable medium 940. Computer-readable medium 940 may include, for example, any non-transitory medium that can carry or make accessible data, code or instructions for one or more of the devices in system 900. Computer-readable medium 940 may also be referred to as a storage medium. For example, computer-readable medium 940 may store computer readable instructions to, at least in part, perform actions shown in FIGS. 5A and 5B and discussed above.

Second device 904 may include, for example, a communication interface 930 that provides for or otherwise supports the operative coupling of second device 904 to at least wireless communications network 908. By way of example but not limitation, communication interface 930 may include a network interface device or card, a modem, a router, a switch, a transceiver, and the like.

Second device 904 may include, for example, an input/output device 932. Input/output device 932 is representative of one or more devices or features that may be configurable to accept or otherwise introduce human or machine inputs, or one or more devices or features that may be configurable to deliver or otherwise provide for human or machine outputs. By way of example but not limitation, input/output device 932 may include an operatively configured display, speaker, keyboard, mouse, trackball, touch screen, data port, etc.

Embodiments described herein are directed to, among other things, a storage medium comprising computer-readable instructions stored thereon which are executable by a one or more processors of a computing device to: obtain timing advance parameters based, at least in part, on signals transmitted from a mobile device to three or more concurrently connected base stations on uplink channels to the three or more base stations; and compute a first estimated location of the mobile device based, at least in part, on the timing advance parameters and locations of the three or more base stations. In one particular implementation, the first estimated location is computed in response to an emergency request, and wherein the instructions are further executable by the one or more processors to compute a second estimated location of the mobile device based, at least in part, on measurements obtained at the mobile device of signals transmitted by the three or more base station. In another particular implementation, the measurements obtained at the mobile device comprise at least a reference signal time difference (RSTD) measurement. In another particular implementation, at least one of the three or more base stations comprise a previously handed over cell. In another particular implementation, the first estimated location of the mobile device is computed from a trilateration computation based, at least in part, on location of the three more base stations and estimates of ranges between the mobile device and the three or more base stations based, at least in part, on the timing advance parameters. In another particular implementation, the computing device obtains the timing advance parameters from one or more messages received from the mobile device comprising the timing advance parameters. In another implementation, the timing advance parameters are obtained by transmission of a Random Access Preambles on uplink channels to the three or more base stations; receipt of Random Access Response messages transmitted in response to the Random Access Preambles; and determination of the plurality of timing advance parameters based, at least in part, on Timing Advance Commands in the received Random Access Response messages. In another particular implementation, at least a portion of the timing advance parameters are obtained from at least one of the three or more base stations while the mobile device and that least one of the three or more base stations has established a radio resource control connection (RCC). In another particular implementation, the instructions are further executable by the one or more processors to obtain the location of the particular base station from assistance data received in one or more messages. In another particular implementation, the timing advance parameters are obtained based, at least in part, on signals transmitted from a mobile device to three or more base stations on uplink channels to the three or more base stations further comprises receiving one or more messages comprising timing advance command MAC control elements and one or more decoded TAG ID fields. In yet another particular implementation, the instructions are further executable by the one or more processors to compute the first estimated location of the mobile device based, at least in part, on the timing advance parameters and locations of the three or more base stations further comprises selectively computing the first estimated location of the mobile device based, at least in part, on the timing advance parameters responsive to a density of femotcells or picocells in a vicinity of the mobile device.

Embodiments described herein are directed to, among other things, a computing device comprising: means for obtaining timing advance parameters based, at least in part, on signals transmitted from a mobile device to three or more concurrently connected base stations on uplink channels to the three or more base stations; and means for computing a first estimated location of the mobile device based, at least in part, on the timing advance parameters and locations of the three or more base stations. In a particular implementation, the first estimated location is computed in response to an emergency request, and wherein the computing device further comprises means for computing a second estimated location of the mobile device based, at least in part, on measurements obtained at the mobile device of signals transmitted by the three or more base station. In another particular implementation, the measurements obtained at the mobile device comprise at least a reference signal time difference (RSTD) measurement. In another particular implementation, at least one of the three or more base stations comprise a previously handed over cell. In another particular implementation, the means for computing the first estimated location of the mobile device further comprises means for performing a trilateration computation based, at least in part, on location of the three more base stations and estimates of ranges between the mobile device and the three or more base stations based, at least in part, on the timing advance measurements. In another particular implementation, the means for obtaining the timing advance parameters further comprises means for receiving one or more messages from the mobile device comprising the timing advance parameters. In another particular implementation, the means for obtaining the timing advance parameters comprises: means for transmitting a Random Access Preambles on uplink channels to the three or more base stations; means for receiving Random Access Response messages transmitted in response to the Random Access Preambles; and means for determining the plurality of timing advance parameters based, at least in part, on Timing Advance Commands in the received Random Access Response messages. In another particular implementation, the means for obtaining the timing advance parameters further comprises means for obtaining at least a portion of the timing advance parameters from at least one of the three or more base stations while the mobile device and that least one of the three or more base stations has established a radio resource control connection (RCC). In another particular implementation, the computing device further comprises means for obtaining the location of the particular base station from assistance data received in one or more messages. In another particular implementation, the means for obtaining timing advance parameters based, at least in part, on signals transmitted from a mobile device to three or more base stations on uplink channels to the three or more base stations further comprises means for receiving one or more messages comprising timing advance command MAC control elements and one or more decoded TAG ID fields. In another particular implementation, the means for computing the first estimated location of the mobile device based, at least in part, on the timing advance parameters and locations of the three or more base stations further comprises means for selectively computing the first estimated location of the mobile device based, at least in part, on the timing advance parameters responsive to a density of femotcells or picocells in a vicinity of the mobile device.

Embodiments described herein are directed to, among other things, a storage medium comprising computer-readable instructions stored thereon which are executable by a one or more processors of a computing device to: obtain a first estimated location of a mobile device based, at least in part, on observations of one or more signals received at a mobile device at an instance; and determine an assessment of movement of the mobile device subsequent to the instance based, at least in part, on timing advance parameters obtained at the mobile device based, at least in part, on signals transmitted from the mobile device to three or more concurrently connected base stations on uplink channels to the three or more base stations. In one particular implementation, the instructions are further executable by the one or more processors to associate one or more first timing advance parameters obtained at the mobile device contemporaneous with the instance, and wherein the instructions are further executable by the one or more processors to compare one or more second timing advanced parameters obtained at the mobile device subsequent to the instance to determine the assessment of movement of the mobile device with the one or more first timing advance parameters. In another particular implementation, wherein the assessment of movement of the mobile device occurs in response to a request for an estimated location of the mobile device, and wherein the instructions are further executable to retrieve the first estimated location of the mobile device to respond to the request for the estimated location of the mobile device in response to the assessment of movement of the mobile device. In another particular implementation, the instructions are further executable by the one or more processors to initiate operations to obtain a second estimated location of a mobile device in response to the assessment. In yet another particular implementation, the instructions are further executable to determine the assessment at least in part in response to an E911 event.

Embodiments described herein are directed to, among other things, a computing device comprising: means for obtaining a first estimated location of a mobile device based, at least in part, on observations of one or more signals received at a mobile device at a instance; and means for determining an assessment of movement of the mobile device subsequent to the instance based, at least in part, on timing advance parameters obtained at the mobile device based, at least in part, on signals transmitted from the mobile device to three or more concurrently connected base stations on uplink channels to the three or more base stations. In a particular implementation, the computing device further comprises means for associating one or more first timing advance parameters obtained at the mobile device contemporaneous with the instance, and wherein means for determining the assessment of movement of the mobile device further comprises means for comparing one or more second timing advanced parameters obtained at the mobile device subsequent to the instance with the one or more first timing advance parameters. In another particular implementation, the means for determining the assessment of movement of the mobile device occurs in response to a request for an estimated location of the mobile device, and the computing device further comprises means for retrieving the first estimated location of the mobile device to respond to the request for the estimated location of the mobile device in response to the assessment of movement of the mobile device. In another particular implementation, the computing device further comprises means for initiating operations for obtaining a second estimated location of a mobile device in response to the assessment. In yet another particular implementation, the means for determining the assessment further comprises means for determining the assessment at least in part in response to an E911 request.

As used herein, the terms "mobile device" and "user equipment" (UE) are used synonymously to refer to a device that may from time to time have a location that changes. The changes in location may comprise changes to direction, distance, orientation, etc., as a few examples. In particular examples, a mobile device may comprise a cellular telephone, wireless communication device, user equipment, laptop computer, other personal communication system (PCS) device, personal digital assistant (PDA), personal audio device (PAD), portable navigational device, and/or other portable communication devices. A mobile device may also comprise a processor and/or computing platform adapted to perform functions controlled by machine-readable instructions.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, or combinations thereof.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions or information. Such storage devices may comprise any one of several media types including, for example, magnetic, optical or semiconductor storage media. Such storage devices may also comprise any type of long term, short term, volatile or non-volatile memory devices. However, these are merely examples of a storage medium, and claimed subject matter is not limited in these respects.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, or any combination of the above networks, and so on. A CDMA network may implement one or more radio access technologies (RATs) such as cdma2000, Wideband CDMA (WCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and WCDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. 4G Long Term Evolution (LTE) and 5G or New Radio (NR) communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femtocell, utilized to extend cellular telephone service into a business or home. In such an implementation, one or more mobile devices may communicate with a femtocell via a code division multiple access (CDMA) cellular communication protocol, for example, and the femtocell may provide the mobile device access to a larger cellular telecommunication network by way of another broadband network such as the Internet.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of the appended claims, and equivalents thereof.

What is claimed is:

1. A method, at a computing device, comprising:
obtaining first timing advance parameters based, at least in part, on signals transmitted from a mobile device to three or more concurrently connected base stations on uplink channels to the three or more base stations;
obtaining a first estimated location for the mobile device;
determining whether the first estimated location satisfies an accuracy requirement based, at least in part, on the first timing advance parameters; and
computing a second estimated location of the mobile device based, at least in part, on the first timing advance parameters and locations of the three or more base stations responsive to the first estimated location not satisfying the accuracy requirement;
wherein determining whether the first estimated location satisfies the accuracy requirement comprises:
comparing second timing advance parameters, associated with the first estimated location, with the first timing advance parameters; and
determining whether a difference between the first timing advance parameters and the second timing advance parameters exceeds a threshold.

2. The method of claim 1, wherein the second estimated location is computed in response to an emergency request, and wherein the method further comprises computing a third estimated location of the mobile device based, at least in part, on measurements obtained at the mobile device of signals transmitted by the three or more base stations.

3. The method of claim 2, wherein the measurements obtained at the mobile device comprise at least a reference signal time difference (RSTD) measurement.

4. The method of claim 1, wherein at least one of the three or more base stations comprise a base station serving a previously handed over cell.

5. The method of claim 1, wherein computing the second estimated location of the mobile device further comprises performing a trilateration computation based, at least in part, on location of the three more base stations and estimates of ranges between the mobile device and the three or more base stations based, at least in part, on the first timing advance parameters.

6. The method of claim 1, wherein obtaining the first timing advance parameters comprises receiving one or more messages from the mobile device comprising the first timing advance parameters.

7. The method of claim 1, wherein obtaining the first timing advance parameters further comprises:
transmitting Random Access Preambles on uplink channels to the three or more base stations;
receiving Random Access Response messages transmitted in response to the Random Access Preambles; and
determining the first timing advance parameters based, at least in part, on Timing Advance Commands in the received Random Access Response messages.

8. The method of claim 7, wherein obtaining the first timing advance parameters further comprises obtaining at least a portion of the first timing advance parameters from at least one of the three or more base stations while the mobile device and that least one of the three or more base stations has established a radio resource control connection (RCC).

9. The method of claim 7, and further comprising obtaining the location of at least one of the three or more base stations from assistance data received in one or more messages.

10. The method of claim 1, wherein obtaining the first timing advance parameters is based, at least in part, on signals transmitted from the mobile device to three or more base stations on uplink channels to the three or more base stations, and
wherein the method further comprises receiving one or more messages comprising timing advance command MAC control elements and one or more decoded TAG ID fields.

11. The method of claim 1, wherein computing the second estimated location of the mobile device based, at least in part, on the first timing advance parameters and locations of the three or more base stations further comprises selectively computing the second estimated location of the mobile device based, at least in part, on the first timing advance parameters responsive to a density of femotcells or picocells in a vicinity of the mobile device.

12. A computing device, comprising:
a memory; and
one or more processors coupled to the memory and configured to:
obtain first timing advance parameters based, at least in part, on signals transmitted from a mobile device to three or more concurrently connected base stations on uplink channels to the three or more base stations;
obtain a first estimated location for the mobile device;
determine whether the first estimated location satisfies an accuracy requirement based, at least in part, on the first timing advance parameters; and
compute a second estimated location of the mobile device based, at least in part, on the first timing advance parameters and locations of the three or more base stations responsive to the first estimated location not satisfying the accuracy requirement;
wherein determining whether the first estimated location satisfies the accuracy requirement comprises:
comparing second timing advance parameters, associated with the first estimated location, with the first timing advance parameters; and
determining whether a difference between the first timing advance parameters and the second timing advance parameters exceeds a threshold.

13. The computing device of claim 12, and further comprising a communication interface to receive messages from a communication network, and
wherein the one or more processors are further configured to obtain the first timing advance parameters from messages received at the communication interface and transmitted by the mobile device.

14. The computing device of claim 12, and further comprising a wireless transceiver, and wherein the one or more processors are further configured to obtain the first timing advance parameters based, at least in part, on transmission of Random Access Preambles transmitted by the wireless transceiver on uplink channels to at least one of the three or more base stations and Random Access Response messages and received at the wireless transceiver.

15. The computing device of claim 14, wherein the one or more processors are further configured to:
   initiate transmission of Random Access Preambles through the wireless transceiver on uplink channels to the three or more base stations;
   obtain Random Access Response messages received at the wireless transceiver and transmitted in response to the Random Access Preambles; and
   determine the first timing advance parameters based, at least in part, on Timing Advance Commands in the received Random Access Response messages.

16. The computing device of claim 12, wherein the second estimated location is computed in response to an emergency request, and wherein the one or more processors are further configured to compute a third estimated location of the mobile device based, at least in part, on measurements obtained at the mobile device of signals transmitted by the three or more base stations.

17. The computing device of claim 16, wherein the measurements obtained at the mobile device comprise at least a reference signal time difference (RSTD) measurement.

18. The computing device of claim 12, wherein at least one of the three or more base stations comprise a base station serving a previously handed over cell.

19. The computing device of claim 12, wherein the one or more processors are further configured to perform a trilateration computation to compute the second estimated location of the mobile device based, at least in part, on locations of the three more base stations and estimates of ranges between the mobile device and the three or more base stations based, at least in part, on the first timing advance parameters.

20. The computing device of claim 12, wherein the one or more processors are further configured to obtain the location of at least one of the three or more base stations from assistance data received in one or more messages.

21. A method, at a computing device, comprising:
   obtaining a first estimated location of a mobile device based, at least in part, on observations of one or more signals received at the mobile device at an instance; and
   determining an assessment of movement of the mobile device from the first estimated location subsequent to the instance based, at least in part, on timing advance parameters obtained at the mobile device based, at least in part, on signals transmitted from the mobile device to three or more concurrently connected base stations on uplink channels to the three or more base stations.

22. The method of claim 21, and further comprising associating one or more first timing advance parameters obtained at the mobile device contemporaneous with the instance, and wherein determining the assessment of movement of the mobile device further comprises comparing one or more second timing advanced parameters obtained at the mobile device subsequent to the instance with the one or more first timing advance parameters.

23. The method of claim 22, wherein determining the assessment of movement of the mobile device occurs in response to a request for an estimated location of the mobile device, and further comprises retrieving the first estimated location of the mobile device to respond to the request for the estimated location of the mobile device in response to the assessment of movement of the mobile device.

24. The method of claim 21, and further comprising initiating operations for obtaining a second estimated location of the mobile device in response to the assessment of movement.

25. The method of claim 21, wherein determining the assessment of movement further comprises determining the assessment of movement at least in part in response to an E911 request.

26. A computing device, comprising:
   a memory; and
   one or more processors coupled to the memory and configured to:
      obtain a first estimated location of a mobile device based, at least in part, on observations of one or more signals received at the mobile device at an instance; and
      determine an assessment of movement of the mobile device from the first estimated location subsequent to the instance based, at least in part, on timing advance parameters obtained at the mobile device based, at least in part, on signals transmitted from the mobile device to three or more concurrently connected base stations on uplink channels to the three or more base stations.

27. The computing device of claim 26, wherein the one or more processors are further configured to associate one or more first timing advance parameters obtained at the mobile device contemporaneous with the instance, and
   wherein the one or more processors are further configured to compare one or more second timing advanced parameters obtained at the mobile device subsequent to the instance with the one or more first timing advance parameters to determine the assessment of movement of the mobile device.

28. The computing device of claim 27, wherein determination of the assessment of movement of the mobile device occurs in response to a request for an estimated location of the mobile device, and wherein the one or more processors are further configured to retrieve the first estimated location of the mobile device from the memory to respond to the request for the estimated location of the mobile device in response to the assessment of movement of the mobile device.

29. The computing device of claim 26, and wherein the one or more processors are further configured to initiate operations to obtain a second estimated location of the mobile device in response to the assessment of movement.

30. The computing device of claim 26, and further comprising a wireless transceiver, and wherein the one or more processors are further configured to:
   obtain the first estimated location of the mobile device based, at least in part, on observations of the one or more signals received at the wireless transceiver at the instance; and
   determine the assessment of movement of the mobile device subsequent to the instance based, at least in part, on the timing advance parameters obtained at the wireless transceiver.

* * * * *